Oct. 31, 1950 L. F. MAYLE 2,527,561

SELECTIVE CALLING SYSTEM

Filed April 30, 1947 2 Sheets-Sheet 1

INVENTOR
LOUIS F. MAYLE
BY Arthur A. Smith
ATTORNEY

Oct. 31, 1950 L. F. MAYLE 2,527,561

SELECTIVE CALLING SYSTEM

Filed April 30, 1947 2 Sheets-Sheet 2

INVENTOR
LOUIS F. MAYLE
BY Arthur A. Smith
ATTORNEY

Patented Oct. 31, 1950 2,527,561

UNITED STATES PATENT OFFICE 2,527,561

SELECTIVE CALLING SYSTEM

Louis F. Mayle, Fort Wayne, Ind., assignor, by mesne assignments, to Farnsworth Research Corporation, a corporation of Indiana Application April 30, 1947, Serial No. 744,934

7 Claims. (Cl. 250—6)

Figure 1:
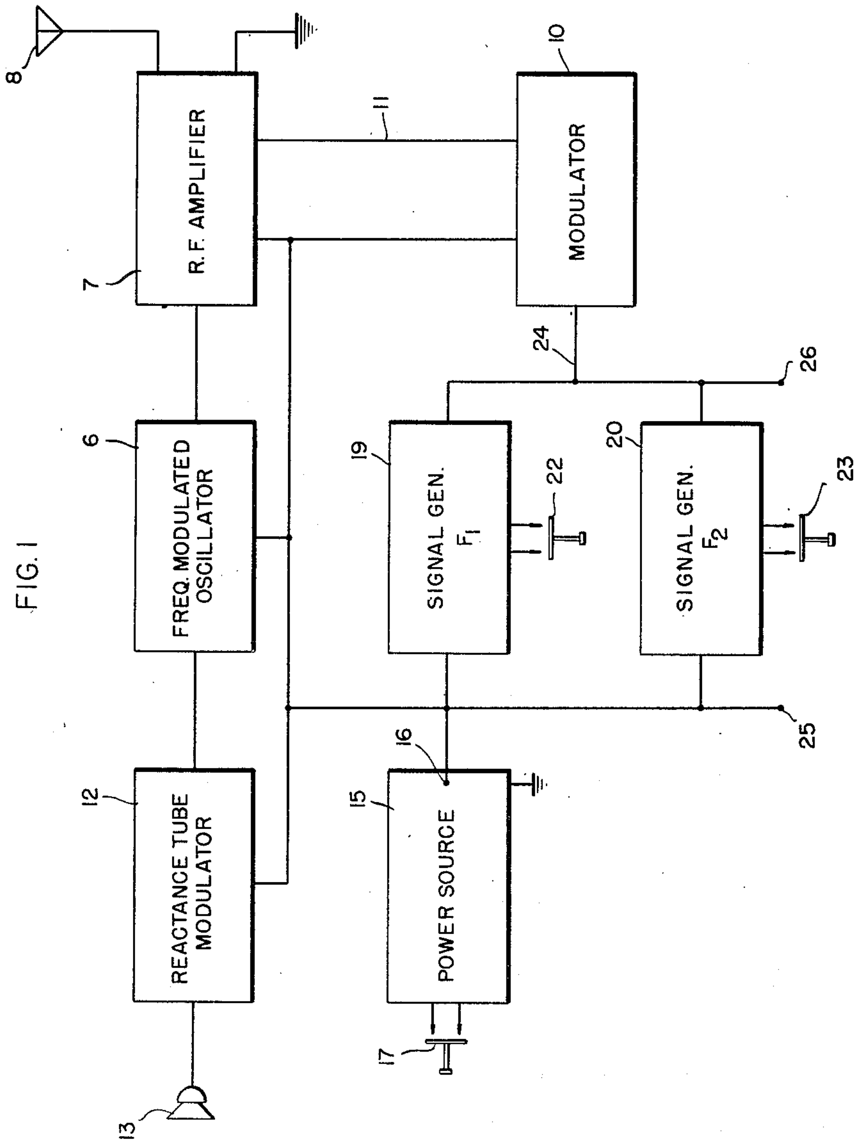

This invention relates generally to radio communication systems, and particularly to a system wherein a frequency modulated carrier signal is amplitude modulated with a selector signal for selectively controlling remote receivers.

For the purpose of increasing the overall efficiency of radio communication systems such as employed by police, airlines or other transport services, it is desirable to selectively render operative a particular remotely located receiving station by means of a control or selector signal. The selector signal may be impressed upon the carrier wave at the transmitter at the discretion of the operator, and it is highly desirable that the selector signal create no interference with the normal transmission of intelligence on the carrier wave. However, conventional communication apparatus employed at the transmitting and receiving stations for selectively rendering a particular receiving station operative comprises complex and expensive installations.

It is an object of the present invention, therefore, to provide a novel selective radio communication system of relative simplicity for remotely controlling a plurality of receiving stations.

Another object of the invention is to provide, in a radio communication system, remote control apparatus whereby a particular receiving station may be selected from a plurality of receiving stations and rendered operative by the transmitting station.

A further object of the invention is to provide, in a radio communication system, apparatus for remote control purposes which is relatively inexpensive and which may be readily incorporated into existing communication systems and wherein the control signals do not interfere with the transmission of intelligence.

In accordance with the present invention there is provided a selective radio communication system comprising a transmitter. The transmitter includes a source of audio signals, a source of a carrier wave and a source of control signals. Means are provided for modulating the frequency of the carrier wave in accordance with the audio signals. Further means are provided for modulating the amplitude of the carrier wave in accordance with a control signal. Finally means are provided for radiating the modulated carrier wave into space.

The selective radio communication system further comprises a receiver which is responsive to the carrier wave developed at the transmitter. Means are provided for demodulating the carrier wave to derive the audio signals and the selected control signal. Furthermore, means are provided which include a normally inoperative amplifier for amplifying and reproducing the audio signals. Finally there are provided means which may include a resonant relay and which are responsive to a control signal of predetermined frequency for rendering the amplifier operative. Thus, the audio signals are reproduced only when a predetermined control signal is received.

For a better understanding of the invention, together with other and further objects thereof, reference is made to the following description, taken in connection with the accompanying drawings, and its scope will be pointed out in the appended claims.

Figure 2:
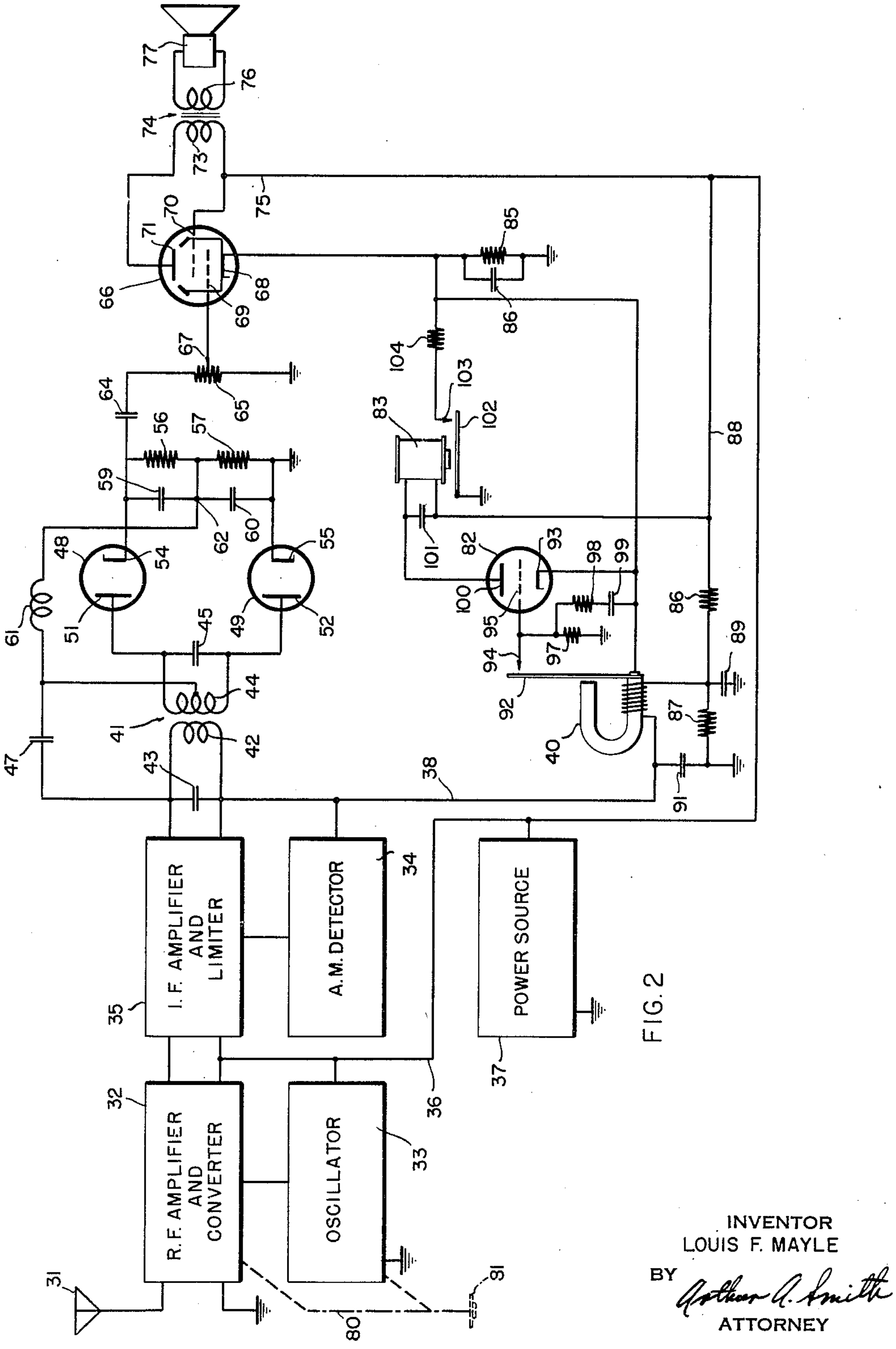

In the accompanying drawings:

Fig. 1 illustrates, in block form, a transmitter comprising apparatus for developing a frequency modulated and amplitude modulated carrier wave in accordance with the present invention; while Fig. 2 is a diagram, partly in block form, of a receiver embodying the present invention wherein the audio output stage of a frequency modulation receiver is adapted to be remotely controlled by a control signal transmitted as an amplitude modulation of the carrier signal.

Referring now to Fig. 1, there is shown a transmitter adapted to develop a carrier wave which may be modulated by audio and by control tone signals. The audio signals are transmitted by frequency modulating the carrier wave therewith, whereas the control tone signals are impressed on the carrier wave by amplitude modulation. There is provided for the generation and amplification of a modulated carrier wave an oscillator 6 and a radio frequency amplifier 7. An antenna 8 is coupled to the radio frequency amplifier 7 for radiating the modulated carrier wave into space. A modulator 10 is coupled to the radio frequency amplifier 7 by means of a conductor 11 whereby the amplitude of the carrier wave generated by the transmitter may be modulated. Audio signals may be impressed on a reactance tube modulator 12 by means of a microphone 13 for the purpose of modulating the frequency of the carrier wave developed by oscillator 6.

A power source 15 provides operating potentials for the oscillator 6, the radio frequency amplifier 7 and the modulators 10 and 12, and connection is made thereto from a power terminal 16. The power source 15 is provided with a power switch 17 whereby the transmitter may be energized.

The operation of the transmitter is substantially conventional. For frequency modulating purposes the reactance tube modulator 12 has applied thereto a modulating audio voltage by means of the microphone 13, and this audio voltage is impressed upon the oscillator 6 whereby the generated carrier wave is frequency modulated at an audio rate. At the same time, signals applied by the modulator 10 to the radio frequency amplifier 7 will cause the frequency modulated carrier wave to be amplitude modulated.

For the purpose of generating control tone signals which are to be impressed upon the radio frequency amplifier 7, there is provided a plurality of signal generators such as 19 and 20. The generators 19 and 20 may be of conventional type and are each adapted to develop a control signal of a different frequency, which may be designated $F_1$ and $F_2$, respectively. The generators are supplied with power by connection to the terminal 16 of the power source 15 and are provided with starting switches 22 and 23 respectively for initiating the operation of each generator. Alternatively, a plurality of generators may be simultaneously energized by their switches to provide an output signal consisting either of a single control tone signal or of a plurality of control tone signals. The output of the signal generators 19 and 20 is applied, by means of a conductor 24, to the modulator 10 where the control signals are impressed by the conductor 11 upon the radio frequency amplifier 7 to modulate the amplitude of the carrier wave.

There is also provided a pair of terminals 25 and 26 which are connected to the output of the power source 15 and of the signal generators 19 and 20 respectively, whereby additional signal generators similar to generators 19, 20 may be coupled thereto when additional control tone signals are required. The generated control signals may be of audible, supersonic, or sub-audible frequency or may consist of any combination of such frequencies.

It will be noted that other mechanical switching means may be substituted for the manually operated switches 22 and 23, such as a telephone dial switching arrangement whereby an individual signal generator or a plurality of signal generators may be singly or jointly operated to develop either a single control signal or a composite control signal comprising a plurality of control tones. The control tone signal is impressed upon the radio frequency amplifier 7 for modulating the amplitude of the carrier wave concurrently with the frequency modulating audio signals whereby, at a particular remotely located receiving station, the control tone signal may render the receiver operative for the reproduction of the audio signals as will be explained hereinafter.

Referring now to Fig. 2, there is shown a receiver of the superheterodyne type responsive to the modulated carrier wave radiated into space by transmitter antenna 8. Those portions of the receiver herein illustrated in block form are conventional. The modulated carrier wave radiated by the transmitter antenna 8 is intercepted by an antenna 31 and is impressed upon a radio frequency amplifier and frequency converter 32. There is also coupled to the frequency converter stage of amplifier 32 a local oscillator 33. The output of the radio frequency amplifier 32 is coupled to the input of a limiter 35 which also functions as an intermediate frequency amplifier. Anode voltage for the radio frequency amplifier and frequency converter 32, the local oscillator 33 and the intermediate-frequency amplifier and limiter 35 are supplied through the conductor 36 which is connected to a power source 37. A conventional amplitude modulation detector 34 is coupled to the intermediate-frequency amplifier stage 35. The operating voltage for the detector 34 is supplied through a conductor 38 and is also obtained from the power source 37 after passing through the winding of a resonant relay 40 which will be more fully described hereinafter.

The output of the limiter 35 is impressed on a discriminator transformer 41, the primary winding 42 of which is tuned to the intermediate frequency by a shunt-connected condenser 43. The discriminator transformer 41 also is provided with a secondary winding 44 which is inductively coupled to the primary winding 42 and is shunted by a condenser 45 by means of which the secondary winding 44 is tuned to the intermediate frequency. A coupling condenser 47 is connected between the upper terminal of the primary winding 42 and the center tap of the secondary winding 44.

For demodulating the intermediate-frequency signal impressed on the transformer 41, there is coupled to the secondary winding 44 a circuit for rectifying or detecting the frequency modulated carrier wave which includes a pair of diode rectifier tubes 48 and 49. The upper terminal of the secondary winding 44 is connected to the anode 51 of diode 48 whereas the lower terminal of the secondary winding 44 is connected to the anode 52 of diode 49. The diodes 48 and 49 are also provided with cathodes 54 and 55 respectively. A rectified signal voltage-distributing network is arranged between the cathodes 54 and 55 in a conventional manner and comprises a pair of resistors 56, 57 and a pair of condensers 59, 60. The upper terminals of the condenser 59 and of the resistor 56 are connected to the cathode 54 of diode 48, while the lower terminals of the condenser 60 and of the resistor 57 are connected to ground and to the cathode 55 of diode 49. A choke coil 61 is connected between the center tap of the secondary winding 44 and the junction point 62 between the condensers 59, 60 and the resistors 56, 57.

The rectified signal energy developed across the voltage-distributing network represents the audio voltage derived from the discriminator circuit and is equal to the algebraic sum of the voltages developed across the diode load resistors 56 and 57. This audio voltage is coupled by a coupling condenser 64 to the upper terminal of a volume control potentiometer 65 by means of which the amplitude of the audio signal applied to an amplifier audio output tube 66 may be controlled. The potentiometer 65 has its lower terminal grounded and is provided with a movable arm or tap 67.

The audio output tube 66 is arranged to amplify the impressed audio voltage and comprises a cathode 68, a control grid 69, a screen grid 70 and an anode 71. The tube 66 is illustrated as a beam power tetrode, however, a conventional pentode could be substituted therefor. The control grid 69 of tube 66 is connected to the movable arm 67 of the potentiometer 65 for controlling the volume of the audio input signal. The anode 71 of the tube 66 is connected through the primary winding 73 of an output transformer 74 and thence by means of a conductor 75 to the power source 37. The screen grid 70 is also connected to the conductor 75 whereby both the screen grid 70 and the anode 71 are provided with operating voltage. The secondary winding 76 of the output transformer 74 is coupled to the primary winding 73 whereby audio signals may be impressed upon a loud-speaker 77 for reproduction.

The radio frequency amplifier 32 may be tuned and the frequency of the wave developed by the oscillator 33 may be varied simultaneously in a conventional manner, by mechanically coupling their respective tuning elements by a linkage 80 controlled manually by a tuning dial 81.

During standby periods, the receiver will function to detect a modulated carrier wave of predetermined frequency. However, until a predetermined control signal modulation component is received, it is desirable that the audio output tube 66 be maintained substantially nonconductive. Thus, no audio signal is reproduced unless selective apparatus, to be hereinafter described, is actuated by a predetermined control signal. The audio output tube 66 is held in a substantially nonconductive state during standby periods because its cathode 68 is connected to a self-bias network consisting of a cathode resistor 85 of relatively high resistance by-passed to ground by a condenser 86.

For the purpose of rendering the audio output tube 66 conductive in response to a control signal, for the reproduction of audio signals, there is provided a control circuit comprising a control tube 82 and a switching relay 83, the operation of both being controlled by the resonant relay 40 responsive to the amplitude modulation control signal radiated by the transmitter antenna 8. Relay 40 is responsive only to the control signal assigned to the particular receiving station.

As hereinbefore explained, the winding of the resonant relay 40 is connected to the detector 34 through the conductor 38 and is in series with the power source 37. A voltage dividing network is provided for establishing the correct operating potential applied to the detector 34 which consists of series resistors 86 and 87. One terminal of resistor 86 is connected to a conductor 88 which is connected to the power source 37 while a terminal of the resistor 87 is connected to ground. The junction point of resistors 86 and 87 is connected to the winding of the resonant relay 40 whereby the voltage at this junction point is impressed on the detector 34. An audio by-pass condenser 89 connects this junction point to ground. The conductor 38 is also by-passed to ground by a radio frequency filtering condenser 91.

The resonant relay 40 is provided with a vibrating contact 92 responsive to a particular control signal and connected to the cathode 93 of control tube 82 and also to the cathode 68 of audio output tube 66. A fixed contact 94 cooperates with the vibrating contact 92 and is connected to the control grid 95 of the tube 82. A grid leak resistor 97 connects the grid 95 to ground. A series network consisting of a resistor 98 and a condenser 99 is connected between the upper terminal of the grid leak resistor 97, that is, the control grid 95 and the vibrating contact 92. The resistance of the resistor 98 is small compared to that of the grid leak resistor 97. The anode 100 of control tube 82 is connected through the relay 83 to the conductor 88 whereby anode space current is provided. The relay 83 is by-passed by a filter condenser 101 and is provided with a movable switch arm 102 and a fixed contact 103. The movable switch arm 102 is connected to ground whereas the fixed contact 103 is connected through a cathode resistor 104 to the cathodes 68 and 93.

The manner in which the amplitude modulation control signal causes the normally quiescent audio output tube 66 to be rendered operative will now be described. It is well known that the limiter circuit of a frequency modulation receiver such as shown at 35 functions to remove amplitude modulation components from the carrier signal and to feed into the discriminator only a frequency modulated wave of substantially constant amplitude. It will be understood, therefore, that the amplitude modulated control signal present in the input circuit of the limiter stage may be removed therefrom and rectified by detector 34 to initiate a switching action.

A discriminator circuit is conventionally arranged in such a manner that when the discriminator is tuned to exact resonance, amplitude modulation components of the modulated carrier wave impressed thereon will substantially disappear. In accordance with the present invention a predetermined control signal is impressed at the transmitter upon the frequency modulated carrier wave in the form of amplitude modulation which the discriminator including diode rectifiers 48, 49 effectively rejects, and this control signal is utilized by the resonant relay 40 which is arranged in the output circuit of the detector 34.

As long as the contacts 92, 94 are open and the resonant relay 40 is not energized, the condenser 99, which is arranged in the grid circuit of the control tube 82, will normally be discharged, that is, its terminal connected to the resistor 98 will be at ground potential. Accordingly, the control tube 82 is nonconductive by reason of the high positive biasing potential applied to its cathode 93 through the high resistance cathode resistor 85. Although the audio output tube 66 is almost biased to cutoff, it will conduct a space current of small magnitude so that a voltage drop is developed across the cathode resistor 85.

When the control signal is of a frequency to which the relay 40 is responsive, the contact 92 will vibrate to intermittently engage with the fixed contact 94. Accordingly, the potential of the cathode 93 is applied to control grid 95 of tube 82 whenever contacts 92, 94 are closed. At that time the condenser 99 is quickly charged through resistor 98 having a low resistance to the potential of the cathode 93. Inasmuch as contacts 92, 94 will engage for a relatively short time only as compared to the periods of time when they are open, the condenser 99 will discharge through the resistors 98 and 97 when contacts 92, 94 are open. During the discharge period of condenser 99 the potential impressed on the grid 95 serves to hold the control tube 82 conductive so that the control tube 82 remains conductive as long as the relay 40 is energized. Since the resistance of the resistor 97 is large compared to that of the resistor 98, most of the voltage drop will occur across the resistor 97. The time constant of the condenser 99 and of the resistors 98, 97 may be chosen with respect to the frequency of the charges applied to the condenser 99, to provide that the tube 82 remains conductive although the current in its anode circuit will vary in magnitude.

Since the anode current for the control tube 82 obtained from the conductor 88 passes through the relay 83, the space current flowing between the cathode 93 and the anode 100 would normally impulsively traverse the relay 83. The filter condenser 101, however, serves to keep the relay 83 continuously energized. When the relay 83 is energized by this space current, its movable switch arm 102 engages with the fixed contact 103 and shunts the low resistance cathode resistor 104 across the high resistance cathode resistor 85. The resistor 85 maintains the cathodes 68 and 93 substantially at cutoff level whereas the resistor 104 has such a low resistance as to reduce the bias voltage to a value which permits the audio output tube 66 to function as a class "A" amplifier.

The reduced bias voltage applied to control tube 82 by cathode resistor 104 still maintains the tube 82 at cutoff because the control tube 82 has a low cutoff voltage while the audio output tube 66 has a high cutoff voltage. However, the control tube 82 is rendered conducting by the action of the resonant relay 40 in the manner explained. It will be apparent therefore, that during standby periods the tubes 66 and 82 are both substantially nonconductive and that the tubes may be rendered conductive under the control of the resonant relay 40.

Assume now that the operator at the transmitter wishes to communicate with a remote receiving station in which the selective relay 40 is responsive to a control frequency $F_1$. The operator will first actuate power switch 17 to render operative the oscillator 6, the radio frequency amplifier 7, the modulator 10 and the reactance tube modulator 12. The oscillator 6 generates a carrier wave which is applied to the amplifier 7 and impressed upon the antenna 8. The antenna 8 will now radiate an unmodulated carrier wave. The generation of a control signal of frequency $F_1$ is accomplished by closing switch 22 whereby the signal generator 19 is energized and the control signal of frequency $F_1$ applied to the modulator 10. In turn, the modulator 10 will cause the amplitude of the carrier wave impressed upon the amplifier 7 to be modulated in accordance with the control signal of frequency $F_1$. For developing a control signal of frequency $F_2$, switch 23 is closed to energize the signal generator 20.

The operator may now speak into the microphone 13 whereupon the voice signals will be applied to the reactance tube modulator 12 and impressed upon the oscillator 6 to cause the frequency of the carrier waves developed therein to be modulated in accordance with the audio signals. The frequency modulated carrier wave is impressed upon the amplifier 7 and has its amplitude modulated in accordance with the control signal. A composite signal is now being transmitted on a radio frequency carrier wave which is simultaneously modulated by amplitude and frequency variations. At the end of the transmitting period the operator discontinues the generation of the carrier wave by opening the power switch 17. The operator will also open the switch 22 whereby the signal generator 19 developing a control signal of frequency $F_1$ is de-energized.

It is to be understood that various combinations of control signals may be employed to selectively call the remote receivers. While in this particular instance the operator has applied the single control signal frequency $F_1$, a plurality of receivers may also be selectively called by modulating the carrier wave with different control signal frequencies.

Each remote receiver which is responsive to the modulated carrier wave radiated into space by antenna 8 will generally be similar to that shown in Fig. 2 except that the relay 40 will be resonant to different control signal frequencies. The resonant relay 40 of Fig. 2 may be made responsive to the control signal frequency $F_1$.

The signals intercepted at the receiver will comprise a carrier wave having its amplitude modulated in accordance with the control signal and its frequency modulated by the audio or voice signals. These signals are employed simultaneously for selective and communication purposes.

The audio output tube 66 will remain operative as long as the resonant relay 40 is actuated by the control signal frequency $F_1$. However, when the control frequency signal $F_1$ is no longer received, the relay 40 is de-energized resulting in the application of a bias voltage which terminates space current through the control tube 82. Accordingly, the relay 83 which is arranged in the anode circuit of control tube 82 also is de-energized thereby causing its switch 102, 103 to open.

The low resistance bias resistor 104 is now disconnected from the circuit of cathode 68 and the high resistance biasing resistor 85 again resumes control whereby the audio output tube 66 is again substantially cutoff. The audio output amplifier 66 of the receiver is again quiescent and reverts to a standby condition until the next control signal frequency $F_1$ is received.

It will be apparent from the foregoing description that simultaneously two or more receivers may be selectively activated by concurrently impressing their appropriate control signals upon the transmitted carrier wave. At each selected receiver only the predetermined control signal is utilized, the additional control signals being ineffective because the selective relay is not responsive to any but the predetermined frequency.

It will be evident that the selective calling system disclosed in the present invention provides relatively simple and inexpensive circuit means whereby the efficiency of prior art radio communication systems may be greatly improved by dispensing with the necessity of alerting a plurality of remote receiver stations when the transmission is intended for a particular receiver only.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including a normally inoperative amplifier for amplifying and reproducing said audio signals, a first resonant relay responsive to a control signal of predetermined frequency, means for impressing said selected control signal on said first relay, a second relay, means including a charge storage element coupled between said relays for energizing said second relay when said first relay is energized, and means including said second relay coupled to said amplifier for rendering said amplifier operative upon energization of said second relay, thereby to amplify and reproduce said audio signals.

2. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including a normally inoperative amplifier for amplifying and reproducing said audio signals, a first resonant relay responsive to a control signal of predetermined frequency, means for impressing said selected control signal on said first relay, a normally inoperative control tube coupled to said first relay and adapted to be rendered conductive upon energization of said first relay, a second relay coupled to said control tube and adapted to be energized upon said control tube conducting space current, and means including said second relay coupled to said amplifier for rendering said amplifier operative upon energization of said second relay, thereby to amplify and reproduce said audio signals.

3. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including an amplifier for amplifying and reproducing said audio signals, said amplifier having a cathode circuit including a first cathode resistor of such a resistance as to normally render said amplifier substantially nonconductive, a second cathode resistor of such a resistance as to render said amplifier conductive, a first resonant relay responsive to a control signal of predetermined frequency, means for impressing said selected control signal on said first relay, a normally inoperative control tube coupled to said first relay and adapted to be rendered conductive upon energization of said first relay, a second relay coupled to said control tube and adapted to be energized upon said control tube conducting space current, and means including said second relay coupled to said cathode circuit for shunting said second resistor across said first resistor to render said amplifier operative upon energization of said second relay, thereby to amplify and reproduce said audio signals.

4. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including a normally inoperative amplifier for amplifying and reproducing said audio signals, a first resonant relay responsive to a control signal of predetermined frequency, means for impressing said selected control signal on said first relay to energize it intermittently when said control signal is of said predetermined frequency, a control tube having input and output electrodes, a source of anode potential, a second relay connected in series with said source across said output electrodes, means for normally applying a cutoff bias voltage between said input electrodes, means coupled to said first relay for removing said bias voltage upon energization of said first relay to render said control tube conductive and to energize said second relay, and means including said second relay for rendering said amplifier conducting.

5. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including an amplifier for amplifying and reproducing said audio signals, a first resonant relay responsive to a control signal of predetermined frequency, means for impressing said selected control signal on said first relay to energize it intermittently when said control signal is of said predetermined frequency, a control tube having input and output electrodes, a source of anode potential, a second relay connected in series with said source across said output electrodes, means for normally applying a cutoff bias voltage between said input electrodes, means coupled to said first relay for removing said bias voltage upon energization of said first relay to render said control tube conductive and to energize said second relay, said amplifier having a cathode circuit including a first cathode resistor of such a resistance as to render said amplifier substantially nonconducting, a second cathode resistor having a low resistance, and means including said second relay for shunting said second resistor across said first resistor to render said amplifier conducting.

6. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including an amplifier for amplifying and reproducing said audio signals, a source of fixed potential having a positive and a negative terminal, said amplifier having a cathode, a first cathode resistor connected between the cathode of said amplifier and said negative terminal and having such a resistance as to render said amplifier substantially nonconducting, a second cathode resistor having a low resistance, a first resonant relay responsive to a control signal of predetermined frequency, means for impressing said selected control signal on said first relay to energize it intermittently when said control signal is of said predetermined frequency, a control tube having a cathode, a control grid and an anode, the cathode of said control tube being connected to the cathode of said amplifier, a second relay connected in series with said source to the anode of said control tube, a grid leak resistor for connecting said control grid to said negative terminal, a network including a storage element in series between the control grid and cathode of said control tube, said first relay being adapted upon energization to connect the cathode to the control grid of said control tube to render said control tube conducting and to energize said second relay continuously, said second relay being adapted to connect said second cathode resistor between the cathode of said amplifier and said negative terminal to render said amplifier conducting.

7. In a selective calling system, a receiver adapted to receive a carrier wave having its frequency modulated in accordance with audio signals and its amplitude modulated in accordance with a control signal of selected frequency, means for frequency demodulating said carrier wave to derive said audio signals and amplitude demodulating said carrier wave to derive said control signal, means including an amplifier for amplifying and reproducing said audio signals, a source of fixed potential having a positive and a negative terminal, said amplifier having a cathode, a first cathode resistor connected between the cathode of said amplifier and said negative terminal and having such a resistance as to render said amplifier substantially nonconducting, a second cathode resistor having a low resistance, a first resonant relay responsive to a control signal of predetermined frequency, means for impressing said selected control signal on said first relay to energize it intermittently when said control signal is of said predetermined frequency, a control tube having a cathode, a control grid and an anode, the cathode of said control tube being connected to the cathode of said amplifier, a second relay connected in series with said source across the cathode and anode of said control tube, a condenser shunted across said second relay, a grid leak resistor for connecting said control grid to said negative terminal, a condenser and resistor in series between the control grid and cathode of said control tube, said first relay being adapted upon energization to interconnect the cathode and the control grid of said control tube to render said control tube conducting and to energize said second relay continuously, said second relay being adapted to connect said second cathode resistor between the cathode of said amplifier and said negative terminal to render said amplifier conducting.

LOUIS F. MAYLE.

REFERENCES CITED

The following references are of record in the file of this patent:

UNITED STATES PATENTS

| Number | Name | Date |
|---|---|---|
| 1,608,969 | Webbe | Nov. 30, 1926 |
| 2,138,042 | Robinson | Nov. 29, 1938 |
| 2,162,901 | Van Dyck | June 20, 1939 |
| 2,236,501 | Goldsmith | Apr. 1, 1941 |
| 2,237,457 | Tellegen | Apr. 8, 1941 |
| 2,245,652 | Dickert | June 17, 1941 |
| 2,250,596 | Mountjoy | July 29, 1941 |
| 2,314,707 | Katzin | Mar. 23, 1943 |
| 2,321,651 | Caraway | June 15, 1943 |
| 2,349,870 | Koch | May 30, 1944 |
| 2,357,975 | Van Roberts | Sept. 12, 1944 |
| 2,361,653 | Van Roberts | Oct. 31, 1944 |
| 2,368,778 | Purington | Feb. 6, 1945 |
| 2,379,720 | Koch | July 3, 1945 |
| 2,392,672 | Koch | Jan. 8, 1946 |
| 2,393,892 | De Ganahl | Jan. 29, 1946 |
| 2,400,948 | Peterson | May 28, 1946 |